United States Patent
Jang et al.

(10) Patent No.: US 11,649,752 B2
(45) Date of Patent: May 16, 2023

(54) GAS ENGINE HEAT PUMP

(71) Applicant: LG ELECTRONICS INC., Seoul (KR)

(72) Inventors: Heejoong Jang, Seoul (KR); Hojong Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/405,175

(22) Filed: Aug. 18, 2021

(65) Prior Publication Data

US 2022/0056829 A1    Feb. 24, 2022

(30) Foreign Application Priority Data

Aug. 20, 2020   (KR) ........................ 10-2020-0104638

(51) Int. Cl.
*F01N 3/08*    (2006.01)
*F02D 19/02*   (2006.01)
(Continued)

(52) U.S. Cl.
CPC ......... *F01N 3/0842* (2013.01); *F02D 19/022* (2013.01); *F02D 19/027* (2013.01);
(Continued)

(58) Field of Classification Search
CPC ...... F02D 19/02; F02D 19/022; F02D 19/027; F02D 29/04; F02D 41/00; F02D 41/0027;
(Continued)

(56) References Cited

U.S. PATENT DOCUMENTS 9,951,673 B2    4/2018  Qi et al.
2012/0216529 A1*  8/2012  Joshi ................... F02B 37/16
                                                           60/602

(Continued)

FOREIGN PATENT DOCUMENTS

DE    10 2015 208 684    11/2016
EP    2 610 473          7/2013
(Continued)

OTHER PUBLICATIONS

WO 2008013157 English Translation Version.*
European Search Report issued in Application No. 21192071.5 dated Jan. 21, 2022.

*Primary Examiner* — John Kwon
*Assistant Examiner* — Johnny H Hoang
(74) *Attorney, Agent, or Firm* — Ked & Associates

(57) ABSTRACT

The present disclosure relates to a gas engine heat pump including: an engine which burns a mixed air of air and fuel; a first charger which compresses the mixed air and supplies to the engine; a first exhaust flow path which is connected to the engine, and through which exhaust gas discharged from the engine flows; and a second charger which is driven by the exhaust gas branched from the first exhaust flow path to a second exhaust flow path, and compresses the exhaust gas discharged from the engine and supplies the compressed exhaust gas to the engine, thereby reducing the emission of nitrogen oxide by recirculating the exhaust gas without additional power consumption.

9 Claims, 11 Drawing Sheets

(51) Int. Cl.
  *F02D 29/04* (2006.01)
  *F02D 41/00* (2006.01)
  *F02D 41/04* (2006.01)
  *F02D 41/14* (2006.01)
  *F02D 41/32* (2006.01)
  *F25B 30/02* (2006.01)

(52) U.S. Cl.
  CPC ......... *F02D 29/04* (2013.01); *F02D 41/0027* (2013.01); *F02D 41/04* (2013.01); *F02D 41/1454* (2013.01); *F02D 41/32* (2013.01); *F25B 30/02* (2013.01)

(58) Field of Classification Search
  CPC ...... F02D 41/04; F02D 41/14; F02D 41/1454; F02D 41/32; F01N 3/08; F01N 3/0842; F25B 30/02
  See application file for complete search history.

(56) References Cited

U.S. PATENT DOCUMENTS

| | | | | |
|---|---|---|---|---|
| 2014/0102093 | A1* | 4/2014 | Honma | F02B 37/183 60/602 |
| 2017/0058821 | A1 | 3/2017 | De Smet et al. | |
| 2018/0371954 | A1* | 12/2018 | Copeland | F02C 6/006 |

FOREIGN PATENT DOCUMENTS

| | | |
|---|---|---|
| EP | 2 639 440 | 9/2013 |
| KR | 10-2007048 | 8/2019 |
| WO | WO 2008/013157 | 1/2008 |

* cited by examiner

GAS ENGINE HEAT PUMP

BACKGROUND OF THE INVENTION

1. Field of the Invention

The present disclosure relates to a gas engine heat pump, and more particularly, to a gas engine heat pump for reducing nitrogen oxide.

2. Description of the Related Art

In general, a heat pump refers to a device that heats and cools a room through a process of compressing, condensing, expanding, and evaporating a refrigerant. When cooling a room, an indoor heat exchanger may serve as an evaporator through which a low-temperature, low-pressure refrigerant passes, and an outdoor heat exchanger may serve as a condenser through which a high-temperature and high-pressure refrigerant passes. On the other hand, when heating a room, the indoor heat exchanger may serve as a condenser, and the outdoor heat exchanger may serve as an evaporator. The heat pump may be classified into an electric heat pump (EHP) that drives a compressor using an electric motor, and a gas engine heat pump (GHP) that drives the compressor using combustion energy of fuel gas.

The gas engine heat pump includes an engine that generates power using a mixture (hereinafter, a mixed air) of fuel and air. For example, the engine may include an engine cylinder to which the mixed air is supplied, and a piston provided to be movable within the cylinder.

The gas engine heat pump may include an air supply device for supplying air and fuel, a fuel supply device, and a mixer for mixing the air and fuel.

The air supply device may include an air filter for purifying air. In addition, the fuel supply device may include a zero governor for supplying fuel at a constant pressure. The air that has passed through the air filter and the fuel discharged from the zero governor may be mixed (mixed air) in the mixer, and supplied to the engine.

Meanwhile, the mixed air passed through the mixer may be supplied to the engine through a supercharging action by a supercharging device. The supercharging device typically includes a supercharger and a turbocharger.

The mixed air flowed into the engine through the supercharging device passes through an intake manifold and is supplied to each of a plurality of engine cylinders formed in the engine. In addition, the mixed air may cause a combustion reaction inside the plurality of engine cylinders, and thermal energy generated according to the combustion reaction may be converted into mechanical energy to drive the compressor.

Exhaust gas generated according to the combustion reaction of the mixed air in the engine may pass through an exhaust manifold, be cooled by coolant through an exhaust gas heat exchanger, and then be discharged to the outside of the gas engine heat pump through a muffler.

At this time, various harmful substances are generated in a process of combusting fuel and air under a high temperature condition, which has a problem in that the harmful substances are discharged to the outside together with the exhaust gas. The harmful substance typically includes nitrogen oxide (NOx), tetrahydrocannabinol (THC), methane (CH4), carbon monoxide (CO), sulfur oxide (SOx), soot (PM), hydrocarbon (HC), and the like.

When the harmful substance is discharged to the outside, various problems including environmental pollution occur, and various researches have been conducted to reduce the problems. Korea Patent Publication No. 10-2007048 (Date of notice Aug. 2, 2019), which is a related art, discloses a device for recirculating the exhaust gas to the engine in order to reduce the emission of exhaust gas.

However, in the case of the prior related art, in order to recirculate the exhaust gas to the engine, a separate device (supercharged blower) that continuously consumes power is required. Accordingly, there is a problem in that the amount of power consumption increases.

SUMMARY OF THE INVENTION

An object of the present disclosure is to solve the above-mentioned problem.

Another object of the present disclosure is to reduce the emission of harmful substances, such as nitrogen oxide, contained in exhaust gas while consuming little additional power.

Another object of the present disclosure is to reduce the emission of harmful substances by recirculating exhaust gas, while satisfying an output condition required for an engine.

A gas engine heat pump according to an embodiment of the present disclosure includes: an engine which burns a mixed air of air and fuel; a first charger which compresses the mixed air and supplies to the engine; a first exhaust flow path which is connected to the engine, and through which exhaust gas discharged from the engine flows; and a second charger which is driven by the exhaust gas branched from the first exhaust flow path to a second exhaust flow path, and compresses the exhaust gas discharged from the engine and supplies the compressed exhaust gas to the engine. Accordingly, there is an effect of reducing the emission of nitrogen oxide by recirculating the exhaust gas without additional power consumption.

The first charger includes: a first compressor for compressing the mixed air to flow into the engine; and a first turbine which is installed in the first exhaust flow path and receives the exhaust gas passing through the first exhaust flow path to drive the first compressor.

The second charger includes: a second turbine which receives the exhaust gas branched from the first exhaust flow path to the second exhaust flow path and drives the second charger; and a second compressor which compresses the exhaust gas that passed through the first turbine and/or the second turbine to flow into the engine.

The gas engine heat pump further includes: a first bypass valve which is installed in the second exhaust flow path to be opened and closed, and when being opened, supplies a portion of the exhaust gas which is discharged from the engine and supplied to the first turbine to the second turbine; and a controller for adjusting an opening degree of the first bypass valve.

The gas engine heat pump further includes: a sensor for measuring concentration of nitrogen oxide contained in the exhaust gas discharged from the engine, and the controller adjusts the opening degree of the first bypass valve, based on the concentration of the nitrogen oxide measured by the sensor.

The controller opens the first bypass valve while increasing opening rate of the first bypass valve as the concentration of the nitrogen oxide becomes higher within a limit range of exhaust gas supplied to the engine, when the concentration of the nitrogen oxide is greater than or equal to a reference concentration, and closes the first bypass valve, when the concentration of the nitrogen oxide is less than the reference concentration.

The limit range of exhaust gas supplied to the engine is defined as a range in which an amount of exhaust gas supplied to the engine is 15% or less of an amount of mixed air supplied to the engine.

The gas engine heat pump further includes: a third exhaust flow path branched from the first exhaust flow path; and a second bypass valve which is installed to be opened and closed in the third exhaust flow path, and discharges a portion of the exhaust gas which is discharged from the engine and supplied to the first turbine, when being opened.

The third exhaust flow path is disposed between the first exhaust flow path and the second exhaust flow path.

The controller adjusts opening rate of the second bypass valve so that a difference between a current output of the engine and a required output of the engine is less than an error value, when the current output of the engine differs from the required output of the engine by the error value or more.

The controller first adjusts the opening rate of the first bypass valve according to the concentration of nitrogen oxide, while adjusting the opening rate of the first bypass valve in a direction in which the error value is reduced, when the current output is different from the required output by the error value or more, and the concentration of nitrogen oxide is greater than or equal to the reference concentration, adjusts the opening rate of the second bypass valve so that a difference between the current output and the required output is less than the error value, when the current output is still different from the required output by the error value or more, and closes the first bypass valve and adjusts the opening rate of the second bypass valve so that the difference between the current output and the required output becomes less than an error value, when the current output is different from the required output by the error value or more, and the concentration of nitrogen oxide is less than the reference concentration.

The gas engine heat pump further includes an exhaust gas heat exchanger for cooling the exhaust gas discharged from the engine, and the second compressor compresses the exhaust gas that passed through the exhaust gas heat exchanger.

The gas engine heat pump further includes an exhaust gas heat exchanger for cooling the exhaust gas discharged from the engine, and the sensor is disposed in downstream of the exhaust gas heat exchanger.

The gas engine heat pump further includes a check valve through which the exhaust gas which is compressed from the second charger and supplied to the engine passes.

Meanwhile, a gas engine heat pump according to another embodiment of the present disclosure includes: an engine which burns a mixed air of air and fuel; a first charger which is driven by receiving the exhaust gas discharged from the engine, and compresses the mixed air to supply to the engine; and a second charger which is driven by receiving a portion of branched exhaust gas which is discharged from the engine and supplied to the first charger, and compresses the exhaust gas discharged from the engine to supply to the engine.

BRIEF DESCRIPTION OF THE DRAWINGS

The above and other objects, features and advantages of the present disclosure will be more apparent from the following detailed description in conjunction with the accompanying drawings, in which.

DETAILED DESCRIPTION OF THE PREFERRED EMBODIMENTS

Figure 1:
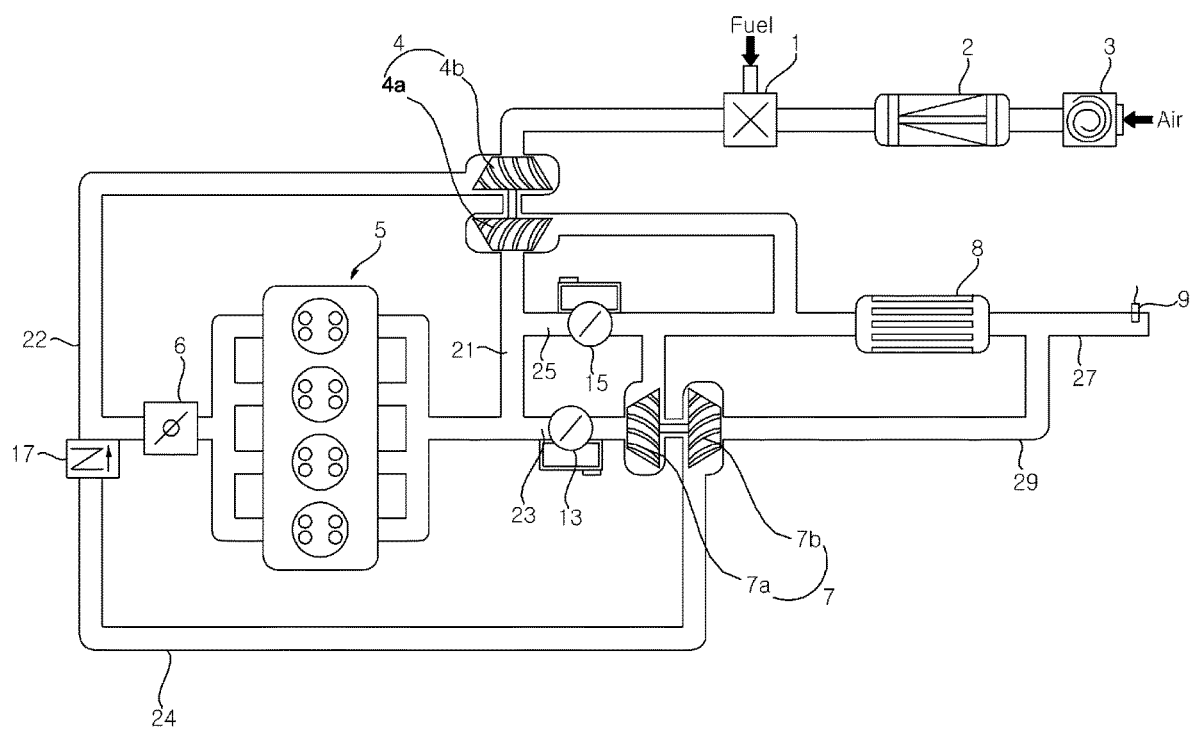
FIG. 1 is a schematic diagram of a gas engine heat pump system according to an embodiment of the present disclosure.

Advantages and features of the present disclosure and methods of achieving them will become apparent with reference to the embodiments described below in detail in conjunction with the accompanying drawings. However, the present disclosure is not limited to the embodiments disclosed below, but may be implemented in various different forms, and these embodiments are provided only to allow the disclosure of the present disclosure to be complete, and to completely inform those of ordinary skill in the art to which the present disclosure belongs, the scope of the invention, and the present disclosure is only defined by the scope of the claims. Like reference numerals refer to like elements throughout.

The terms spatially relative, "below", "beneath", "lower", "above" and "upper" and the like can be used to easily describe the correlation of elements with other elements. Spatially relative terms should be understood in terms of the directions shown in the drawings, including the different directions of components at the time of use or operation. For example, when inverting an element shown in the drawings, an element described as "below" or "beneath" of another element may be placed "above" of another element. Thus, the exemplary term "below" may include both downward and upward directions. The elements may also be oriented in a different direction, so that spatially relative terms can be interpreted according to orientation.

The terminology used herein is for the purpose of illustrating embodiments and is not intended to restrict the invention. In this specification, singular forms include plural forms unless the context clearly dictates otherwise. It is noted that the terms "comprises" and/or "comprising" used in the specification mean that mentioned elements, steps, and/or operations do not exclude the presence or addition of one or more of other elements, steps, and/or operations.

Unless defined otherwise, all terms (including technical and scientific terms) used herein may be used in a sense commonly understood by a person having ordinary skill in the art to which the claimed invention pertains. In addition, commonly used predefined terms are not ideally or excessively interpreted unless explicitly defined otherwise.

In the drawings, the thicknesses and sizes of respective elements are exaggerated, omitted, or schematically shown for convenience and clarity of explanation. In addition, the size and area of each element do not entirely reflect actual size or area.

Hereinafter, the present disclosure will be described with reference to the drawings for explaining a gas engine heat pump of the present disclosure according to embodiments of the present disclosure.

Hereinafter, referring to FIG. 1, the gas engine heat pump according to the present disclosure includes an engine 5 for driving a compressor (not shown) by burning a mixed air of air and fuel.

The fuel and air may be supplied through a fuel supply device and an air supply device, respectively. In addition, the supplied fuel and air may be mixed to be a mixed air through a mixer 1.

The air supply device may include an air filter 2 for purifying air. In addition, the air supply device may include a silencer 3 for reducing noise caused by the inflow of air. In addition, the fuel supply device may include a zero governor (not shown) for supplying fuel at a constant pressure.

Meanwhile, the gas engine heat pump of the present disclosure includes a first charger 4 for compressing the exhausted mixed air which is mixed after air and fuel are mixed in the mixed air 1 and supplying to the engine 5. The first charger 4 may compress the air and fuel to atmospheric pressure or higher in the mixer 1 by adjusting a rotation speed.

The first charger 4 may be a turbocharger driven by exhaust gas discharged from the engine. The first charger 4 may include a first compressor 4b that compresses the mixed air and introduces the compressed mixed air into the engine 5, and a first turbine 4a that receives the exhaust gas discharged from the engine 5 to drive the first compressor 4b. The first compressor 4b may be disposed in the upstream side of the engine 5 and may be connected to an intake side of the engine 5. In addition, the first turbine 4a may be disposed in the downstream side of the engine 5 to receive exhaust gas from the engine 5.

Meanwhile, the gas engine heat pump may include a control means 6. For example, the control means 6 may be provided as a valve to which an electronic throttle control (ETC) method is applied. Fuel and air are mixed in the mixer 1, and may be pressurized at a high pressure in the first charger 4 which is a supercharging means. Then, as the opening degree of the control means 6 is adjusted, the amount of the mixed air may be adjusted and supplied to the engine 5.

In addition, the gas engine heat pump of the present disclosure includes a second charger 7 which is driven by the exhaust gas discharged and branched from the engine 5, compresses the exhaust gas discharged from the engine and supplies the exhaust gas to the engine 5.

Meanwhile, an exhaust flow path connected to the downstream of the engine 5 may be branched into a plurality flow paths, and thus, the exhaust gas discharged from the engine 5 may be branched and flow into the plurality of flow paths.

Specifically, the gas engine heat pump of the present disclosure may include a first exhaust flow path 21 which is connected to the engine 5 and through which exhaust gas discharged from the engine flows. In addition, the gas engine heat pump may include at least one of a second exhaust flow path 23 and a third exhaust flow path 25 which are a bypass flow path branched from the first exhaust flow path 21.

At this time, the second charger 7 is driven by the exhaust gas branched from the first exhaust flow path 21 to the second exhaust flow path 23, and compresses the exhaust gas discharged from the engine 5 and supplies to the engine 5.

Meanwhile, when the first charger 4 is a turbocharger, a first turbine 4a may be installed in the first exhaust flow path 21 to receive the exhaust gas passing through the first exhaust flow path 21 and drive the first compressor 4b.

In addition, the second charger 7 includes a second compressor 7b for compressing the exhaust gas and reintroducing the compressed exhaust gas into the engine, and a second turbine 7a for driving the second compressor 7b by receiving the exhaust gas discharged from the engine 5.

Specifically, the second turbine 7a may receive the exhaust gas branched from the first exhaust flow path 21 to the second exhaust flow path 23 to drive the second charger 7. In addition, the second compressor 7b may compress the exhaust gas that has passed through the first turbine 4a and/or the second turbine 7a and introduce the compressed exhaust gas into the engine 5.

The second compressor 7b may compress the exhaust gas discharged from the engine 5. That is, the second compressor 7b may compress the exhaust gas which is discharged from the engine 5 and passed through at least one of the first exhaust flow path 21 and the second exhaust flow path 23 and may be introduced into the engine 5. In addition, when a third exhaust flow path 25 is provided in the gas engine heat pump of the present disclosure, the second compressor 7b may compress the exhaust gas which is discharged from the engine 5 and passed through at least one of the first to third exhaust flow paths 21, 23, and 25, and may be introduced into the engine 5.

Accordingly, the second charger 7 may recirculate the exhaust gas to the engine 5 without additional power consumption, and may reduce the discharge amount of exhaust gas and the amount of nitrogen oxides among the exhaust gas.

Meanwhile, the gas engine heat pump of the present disclosure may include a first bypass valve 13 which is installed in the second exhaust flow path 23 to be opened and closed. The first bypass valve 13 may be an exhaust gas recirculation (EGR).

When the first bypass valve 13 is opened, a portion of the exhaust gas which is discharged from the engine and supplied to the first exhaust flow path 21 may be introduced into the second exhaust flow path 23 and supplied to the second turbine 7a. The first bypass valve 13 is connected to a controller 30 (refer to FIG. 4), so that the opening degree can be precisely controlled.

Accordingly, the amount of exhaust gas flowing into the first charger 4 can be adjusted, so that the load required for the engine 5 can be satisfied. At the same time, as described above, there is an effect of reducing the discharge amount of exhaust gas.

Meanwhile, the gas engine heat pump of the present disclosure may include a sensor 9 for measuring the concentration of nitrogen oxide (NOx) contained in the exhaust gas discharged from the engine 5. The sensor 9 may measure the concentration of nitrogen oxide included in the exhaust gas that has passed through the first to third exhaust flow paths 21, 23, 25. The harmful substances that can be measured by the sensor 9 are not limited to the nitrogen oxide.

In addition, the controller 30 (refer to FIG. 4) may be connected to the sensor 9 to receive the nitrogen oxide concentration measured from the sensor 9. The controller 30 may adjust the opening degree of the first bypass valve 13 based on the concentration of nitrogen oxide measured by the sensor 9.

Meanwhile, the gas engine heat pump of the present disclosure may include a second bypass valve 15 that is installed to be opened and closed in the third exhaust flow path 25 branched from the first exhaust flow path 21. When the second bypass valve 15 is opened, a portion of the exhaust gas which is discharged from the engine 5 and supplied to the first turbine 4a may be discharged to the outside. The second bypass valve 15 is connected to the controller 30 (refer to FIG. 4), so that the opening degree can be precisely controlled.

Accordingly, the second bypass valve 15 may adjust the amount of exhaust gas supplied to the first charger 4 to satisfy a load condition required for the engine 5.

The third exhaust flow path 25 in which the second bypass valve 15 is installed may be disposed between the first exhaust flow path 21 and the second exhaust flow path 23. Therefore, when both the first bypass valve 13 and the second bypass valve 15 are opened, the exhaust gas that is not supplied to the first turbine 4a is first entered into the second exhaust flow path 23, which is a route for reducing nitrogen oxides, rather than into the third exhaust flow path 25, which is simply a route through which exhaust gas is discharged to the outside.

Meanwhile, the gas engine heat pump of the present disclosure may include an exhaust gas heat exchanger 8 for cooling the exhaust gas discharged from the engine 5. In the exhaust gas heat exchanger 8, cooling water exchanging heat with the exhaust gas may flow. Exhaust gas may be discharged to the outside while being cooled through the exhaust gas heat exchanger 8. In order to reduce noise when exhaust gas is discharged to the outside, the gas engine heat pump may further include a muffler (not shown).

The exhaust gas heat exchanger 8 may exchange heat with the exhaust gas that has passed through the first turbine 4a and/or the second turbine 7a. The exhaust gas heat exchanger 8 may cool the exhaust gas by exchanging heat with the exhaust gas that has passed through at least one of the first to third exhaust flow paths 21, 23, 25.

In addition, the second compressor 7b may compress the exhaust gas that has passed through the exhaust gas heat exchanger 8. At this time, the second compressor 7b may be disposed in the downstream side of the exhaust gas heat exchanger 8. In addition, the exhaust gas passed through the exhaust gas heat exchanger 8 is branched, some may be discharged to the outside, and some may be supplied to the second compressor 7b while the second compressor 7b is driven.

More specifically, the first to third exhaust flow paths 21, 23, 25 may be converged into a fourth exhaust flow path 27 which is a single flow path. In the fourth exhaust flow path 27, cooling water which passed through the exhaust gas heat exchanger 8 and flows through the exhaust gas heat exchanger 8 and the exhaust gas flowing through the fourth exhaust flow path 27 can exchange heat with each other. At this time, a recirculation flow path 29 is formed by branching from the fourth exhaust flow path 27, and a second compressor 7b may be installed in the recirculation flow path 29. Accordingly, when the second charger 7 is driven, a portion of the exhaust gas passing through the fourth exhaust flow path 27 may be branched into the recirculation flow path 29 and supplied to the second compressor 7b.

Accordingly, the high-temperature exhaust gas which is compressed and discharged from the engine 5 may be supplied to the engine 5 while being cooled by the exhaust gas heat exchanger 8 before being recirculated to the engine 5 by the second charger 7. Therefore, reduction in efficiency of the engine 5 can be prevented.

In this case, the sensor 9 may be disposed in the downstream of the exhaust gas heat exchanger 8. The sensor 9 may be disposed in the fourth exhaust flow path 27.

In general, since the temperature of the exhaust gas immediately after being discharged from the engine 5 ranges from about 400 to 800 degrees, when the sensor 9 measures the concentration of harmful gas contained in the high-temperature exhaust gas, there is a problem that the sensor 9 device may be damaged. Accordingly, the sensor 9 is cooled by the exhaust gas heat exchanger 8, and measures the concentration of harmful gas contained in the exhaust gas having a temperature ranging from about 50 to 200 degrees, thereby reducing such a problem.

Meanwhile, the gas engine heat pump of the present disclosure may include a check valve 17 through which exhaust gas which is compressed from the second charger 7 and supplied to the engine 5 passes. The check valve may be connected to the upstream side of the control means 6.

For example, when the engine 5 is driven, the amount of exhaust gas supplied to the first charger 4 to supercharge air may be greater than the amount of exhaust gas supplied to the second charger 4. Accordingly, the supercharging pressure of the mixed air compressed by the first charger 4 may be much greater than the supercharging pressure of the exhaust gas which is compressed from the second charger 7 and supplied to the engine 5. In this case, the exhaust gas may not be recirculated and may flow backward from a second intake flow path 24.

In order to prevent such a problem, the check valve 17 may allow the exhaust gas to flow only in the direction in which the exhaust gas is supplied to the engine 5, and may prevent the exhaust gas from flowing in the reverse flow direction. Accordingly, it is possible to prevent the exhaust gas recirculated to the engine 5 from flowing back to the second compressor 7b side due to the pressure of the mixed air and the exhaust gas.

Hereinafter, referring to FIGS. 2 and 3, as described above, the mixed air in which air and fuel are mixed in the mixer 1 may be introduced into the engine 5 by driving the first charger 4. The amount of the mixed air introduced into the engine 5 can be precisely controlled by the control means 6.

Figure 2:
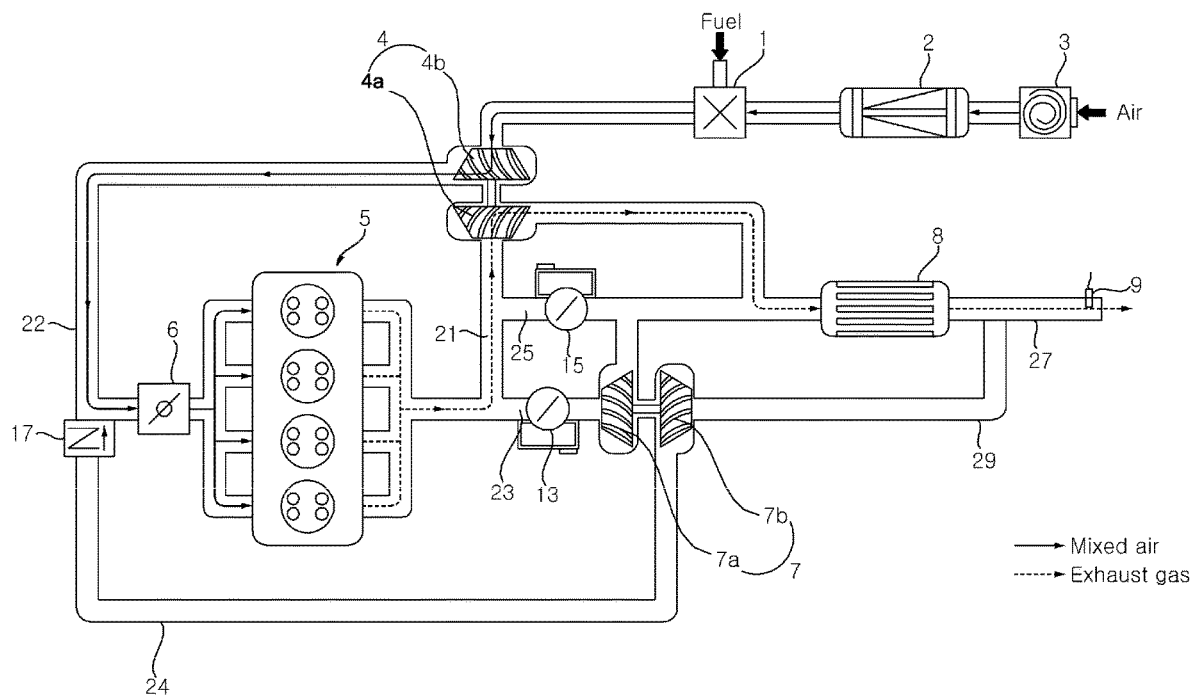
FIG. 2 is a schematic diagram illustrating a flow of a mixed air and exhaust gas according to an embodiment, in the gas engine heat pump of FIG. 1.

Referring to FIG. 2, the first bypass valve 13 and the second bypass valve 15 may be closed. Accordingly, the exhaust gas discharged from the engine 5 flows only to the first exhaust flow path 21 and is supplied to the first turbine 4a, and the first turbine 4a may drive the first compressor 4b so that the mixed air is introduced into the engine 5. The exhaust gas passed through the first turbine 4a may be cooled through the exhaust gas heat exchanger 8 and then discharged to the outside. This may be a case where the output required for the engine 5 is maximum.

Figure 3:
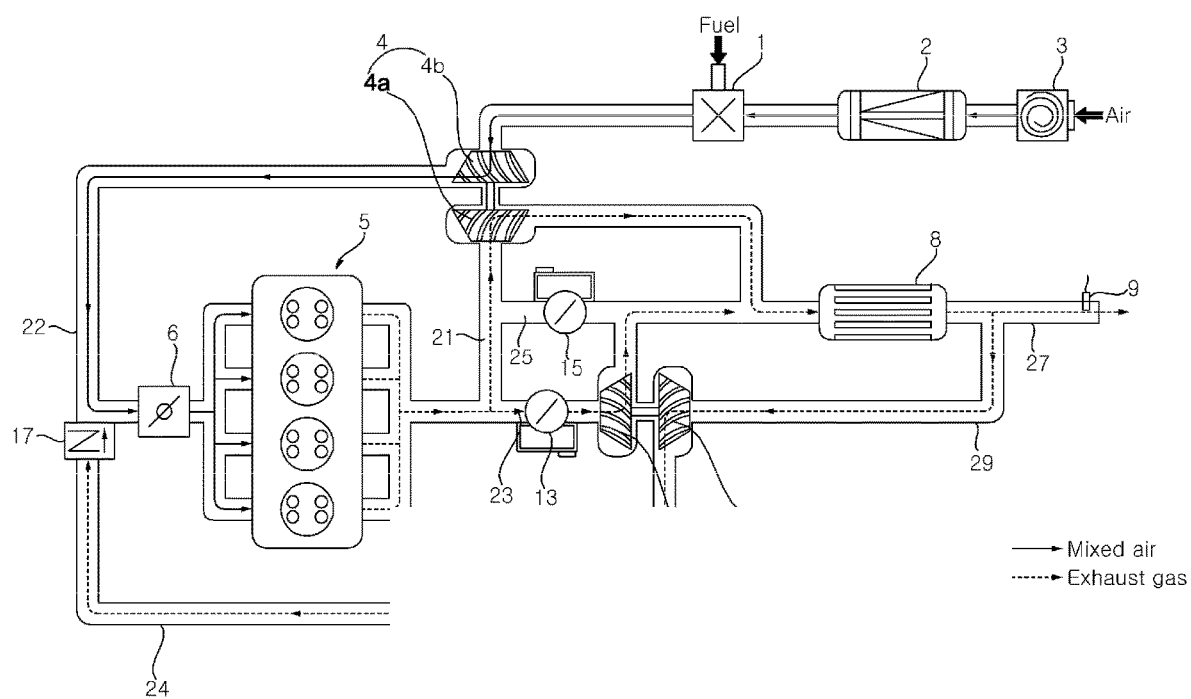
FIG. 3 is a schematic diagram illustrating a flow of a mixed air and exhaust gas according to another embodiment, in the gas engine heat pump of FIG. 1.

Meanwhile, referring to FIG. 3, the first bypass valve 13 may be opened and the second bypass valve 15 may be closed. Accordingly, a portion of the exhaust gas which is discharged from the engine 5 and flows into the first exhaust flow path 21 may be branched into the second exhaust flow path 23. The amount of the branched exhaust gas may be adjusted according to the opening degree of the second bypass valve 13.

The exhaust gas branched into the second exhaust flow path 23 may be supplied to the second turbine 7a, and the second turbine 7a may drive the second compressor 7b. The exhaust gas passed through the first and second exhaust flow paths 21 and 23 flows to the fourth exhaust flow path 27, and a portion of the exhaust gas flowing through the fourth exhaust flow path 27 may be branched to the recirculation flow path 29 and supplied to the second compressor 7b. The supplied exhaust gas may be compressed by the second compressor 7b and supplied to the engine 5.

Meanwhile, although omitted in FIGS. 2 and 3, in order to match the current output of the engine 5 to the output required for the engine 5, the second bypass valve 15 installed in the third exhaust flow path 25 is opened, so that a portion of the exhaust gas flowing toward the first turbine 4a can be introduced into the third exhaust flow path 25.

Figure 4:
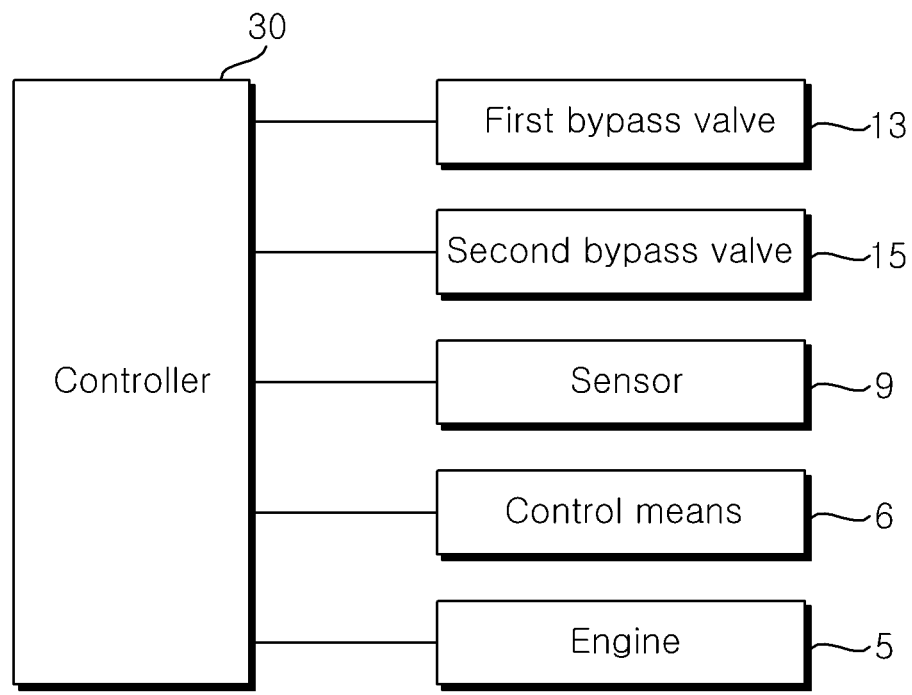
FIG. 4 is a block diagram of a control configuration of a gas engine heat pump of the present disclosure.

Hereinafter, referring to FIG. 4, the controller 30 is connected to at least one of the engine 5, the control means 6, the sensor 9, the first bypass valve 13, and the second bypass valve 15, and may control the operation of the connected configuration. In this case, when the first charger 4 is a supercharger, the controller 30 may be separately connected to the first charger 4 as well.

The controller 30 may adjust the number of revolutions of the first charger 4. For example, when the first charger 4 is a supercharger, the controller 30 may directly apply power to the first charger 4 to adjust the number of revolutions of the first charger 4. As another example, when the first charger 4 is a turbocharger, the controller 30 may adjust the opening degree of the first bypass valve 13 and/or the second bypass valve 15 to adjust the number of revolutions of the first charger 4.

The controller 30 may adjust the opening degree of the control means 6. The amount of the high-pressure mixed air supplied to the engine 5 through the control means 6 may be precisely controlled by the controller 30.

The controller 30 may receive information related to the current output and the required output of the engine 5 from the engine 5. To this end, the engine 5 may be provided with a sensor (not shown) therein.

Hereinafter, referring to FIG. 5, the sensor 9 of the gas engine heat pump according to the embodiment of the present disclosure may measure the nitrogen oxide concentration among the exhaust gas discharged from the engine 5 (S11). Thereafter, the controller 30 may receive the concentration value of nitrogen oxide measured from the sensor 9. The controller 30 may adjust the opening degree of the first bypass valve 13, based on the nitrogen oxide concentration measured by the sensor 9 (S12 and S13).

More specifically, the controller 30 may compare the concentration (current concentration) of nitrogen oxide measured by the sensor 9 with a reference concentration (S12). Thereafter, the controller 30 may open the first bypass valve 13 when the current concentration of nitrogen oxide is greater than or equal to the reference concentration (Yes at S12), while adjusting the opening rate of the first bypass valve 13 according to the concentration of nitrogen oxide (S13). In addition, when the concentration of the nitrogen oxide is less than the reference concentration (No at S12), the controller 30 may close the first bypass valve 13 (S14).

That is, the controller 30 may increase the opening rate of the first bypass valve 13 as the concentration of the nitrogen oxide increases. In other words, as the concentration of the nitrogen oxide decreases, the opening rate of the first bypass valve 13 may be decreased.

At this time, when the exhaust gas supplied to the engine 5 is too large compared to the mixed air, the amount of the mixed air introduced into the engine 5 may decrease. Thus, there occurs an efficiency problem. Therefore, it is preferable to appropriately limit the opening rate of the first bypass valve 13. That is, it is possible to increase the opening rate of the first bypass valve 13 within a limit range of exhaust gas supplied to the engine 5. The opening rate of the first bypass valve 13 according to the limit range of exhaust gas may be less than X % (S13).

For example, the limited range of the exhaust gas supplied to the engine 5 may be defined as a range in which the amount of the exhaust gas supplied to the engine is 15% or less of the amount of the mixed air supplied to the engine. In this case, the opening rate of the first bypass valve 13 may be about 15%.

Figure 5:
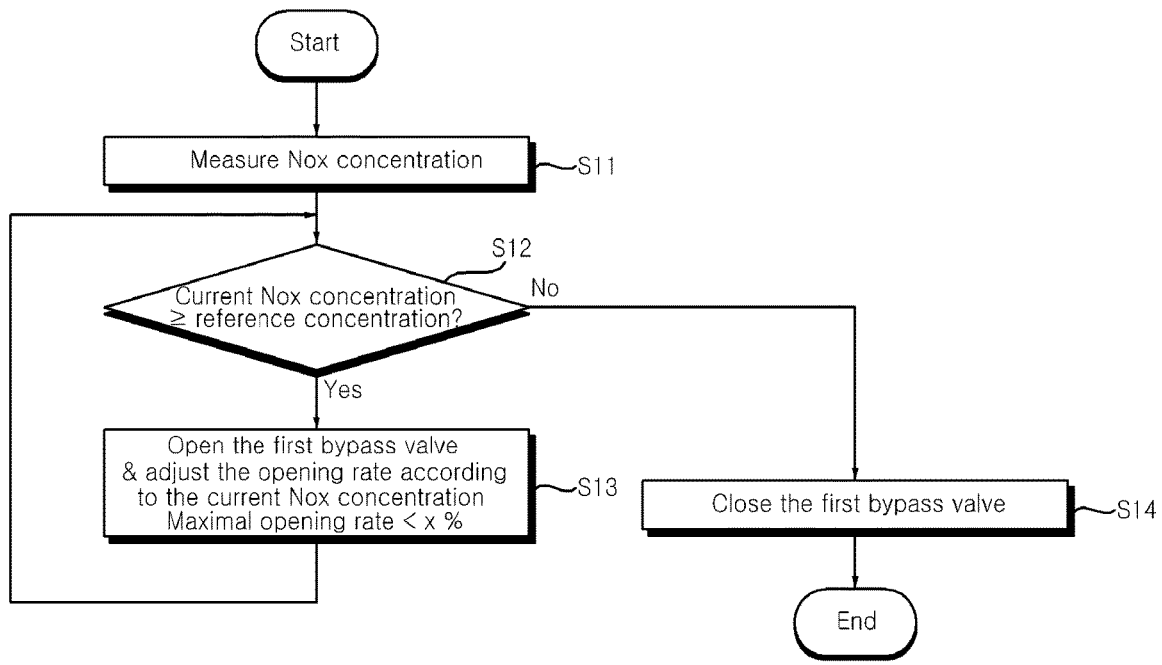
FIG. 5 is a flowchart of a control method of a gas engine heat pump according to an embodiment of the present disclosure.
Figure 6:
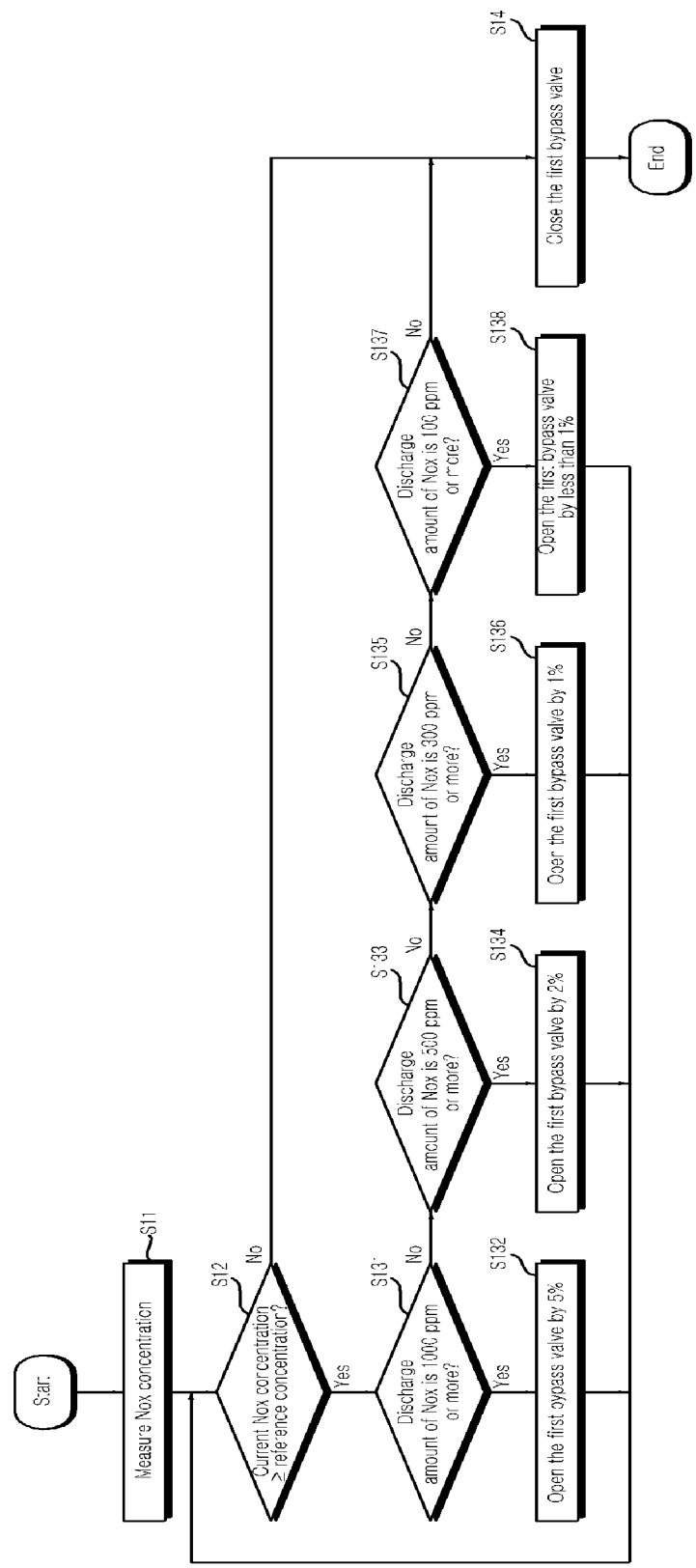
FIG. 6 is a detailed view illustrating an embodiment of the flowchart of FIG. 5.

Hereinafter, referring to FIG. 6, an embodiment of the process S13 of FIG. 5 is schematically illustrated.

The controller 30 may compare the concentration (current concentration) of nitrogen oxide measured by the sensor 9 with the reference concentration (S12). Then, when the current concentration of nitrogen oxide is higher than the reference concentration (Yes at S12), the controller 30 opens the first bypass valve 13, but may adjust the opening rate of the first bypass valve 13 according to the concentration of nitrogen oxide (S13), within the limit range of exhaust gas supplied to the engine.

For example, when the discharge amount of nitrogen oxide is 1000 ppm or more (Yes at S131), the controller 30 may open the first bypass valve S132 by 5%. Thereafter, the controller 30 may return to the previous step and compare the current concentration of nitrogen oxide with the reference concentration (S12).

Then, when the current concentration of nitrogen oxide is equal to or more than the reference concentration (Yes at S12), if the discharge amount of nitrogen oxide is less than 1000 ppm (No at S131), and is equal to or more than 500 ppm (Yes at S133), the controller 30 may open the first bypass valve (S132) by 2% (S134). Thereafter, the controller may return to the previous step and compare the current concentration of nitrogen oxide with the reference concentration (S12).

Thereafter, the controller 30 may repeat the same process to adjust the opening rate of the first bypass valve 13 according to the discharge amount of nitrogen oxide. In addition, when the current concentration of nitrogen oxide is less than the reference concentration (No at S12), the controller 30 may close the first bypass valve 13.

Hereinafter, referring to FIG. 7, the controller 30 may receive the current output of the engine 5 and the output required for the engine 5 (S21). Thereafter, the controller 30 may compare the output required for the engine 5 with the current output (S22).

At this time, when a difference between the current output and the required output is equal to or more than an error value q (Yes at S22), the controller 30 adjusts the opening rate of the second bypass valve 15 according to the required output so that the difference between the current output and the required output is less than the error value q (S23).

Thereafter, the controller 30 continuously compares the current output and the required output of the engine 5 again, and if the difference between the current output and the required output is equal to or greater than the error value q, the above process is repeated, and if the difference is less than the error value q (No at S22), the opening rate of the second bypass valve 15 is maintained and the process is terminated.

Figure 7:
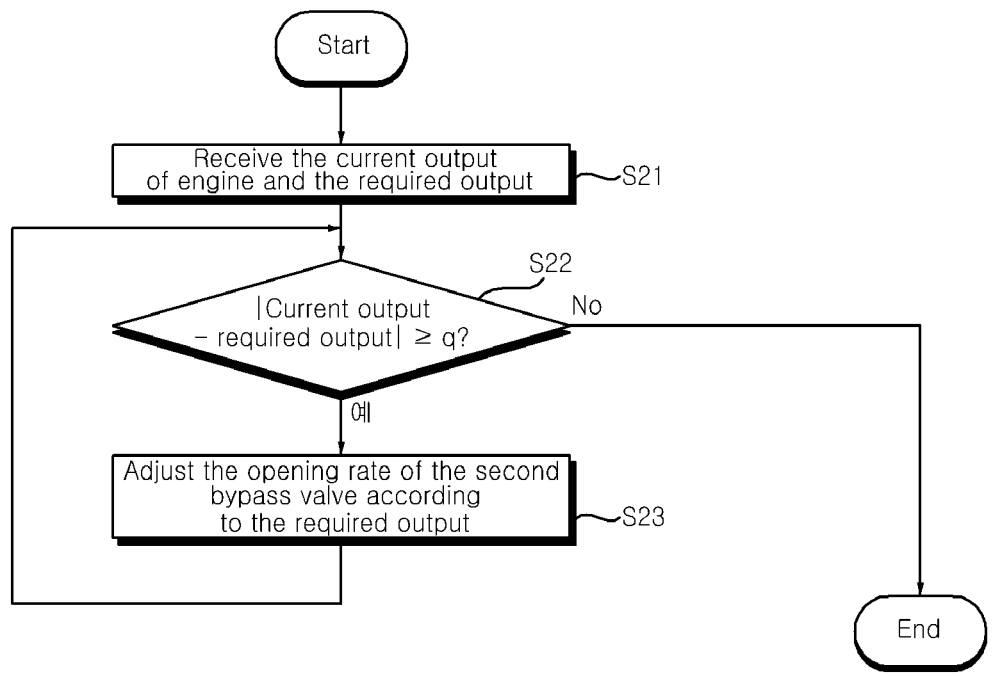
FIG. 7 is a flowchart of a control method of a gas engine heat pump according to another embodiment of the present disclosure.
Figure 8:
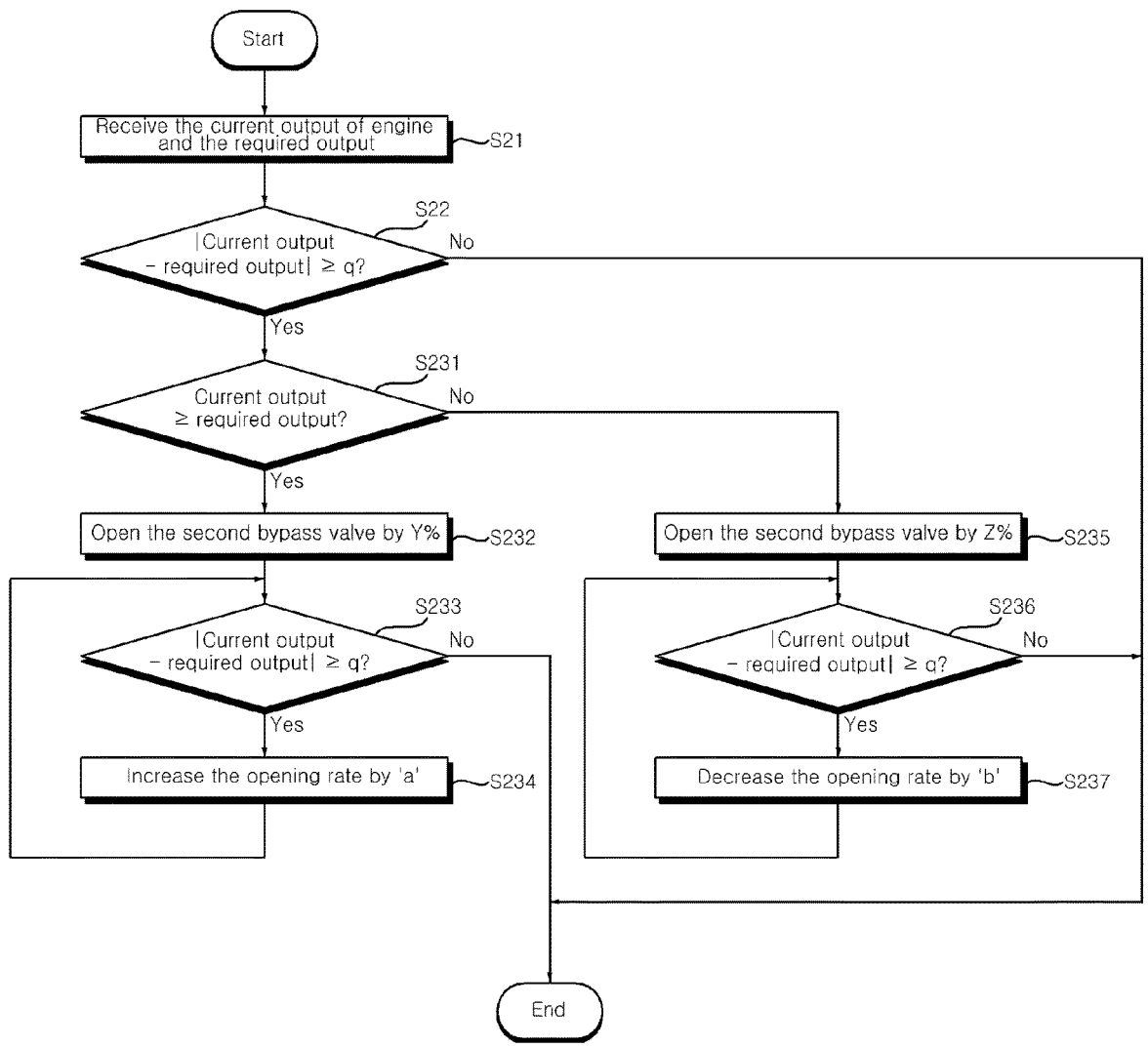
FIG. 8 is a detailed view illustrating an embodiment of the flowchart of FIG. 7.

Hereinafter, referring to FIG. 8, an embodiment of the process S23 of FIG. 7 is schematically illustrated.

The controller 30 compares the current output and the required output of the engine 5, and if the difference between the current output and the required output is less than the error value q (No at S22), the process is terminated while maintaining the current opening rate of second bypass valve 15. When the difference between the current output and the required output is equal to or greater than the error value q (Yes at S22), it may be determined whether the current output is equal to or greater than or less than the required output (S231).

If the current output is greater than or equal to the required output (Yes at S231), the controller 30 may open the second bypass valve 15 by Y % (S232). Thereafter, if the difference between the current output and the required output is still greater than or equal to the error value q (Yes at S233), the controller 30 may increase the opening rate of the second bypass valve 15 by a (S234). That is, the controller 30 opens the second bypass valve 15 by (Y+a) %, and then compares again the current output of the engine 5 with the required output (S233).

Thereafter, if the difference between the current output and the required output is still greater than or equal to the error value q (Yes at S233), the controller 30 repeats the process of increasing the opening rate of the second bypass valve 15 by a. Then, when the difference between the current output and the required output is less than the error value q, the process is terminated (No at S233).

When the current output is less than the required output (No at S231), the controller 30 may open the second bypass valve 15 by Z % (S235). In this case, the value Z may be smaller than the value Y. Thereafter, when the difference between the current output and the required output is still greater than or equal to the error value q (Yes at S236), the controller 30 may decrease the opening rate of the second bypass valve 15 by b (S237). That is, after opening the second bypass valve 15 by (Z−b) %, the controller 30 compares again the current output of the engine 5 with the required output (S236).

Thereafter, if the difference between the current output and the required output is still greater than or equal to the error value q (Yes at S236), the controller 30 repeats the process of reducing the opening rate of the second bypass valve 15 by b. Then, when the difference between the current output and the required output is less than the error value q, the process is terminated (No at S236). The above series of control processes can be implemented as a fuzzy control.

Figure 9:
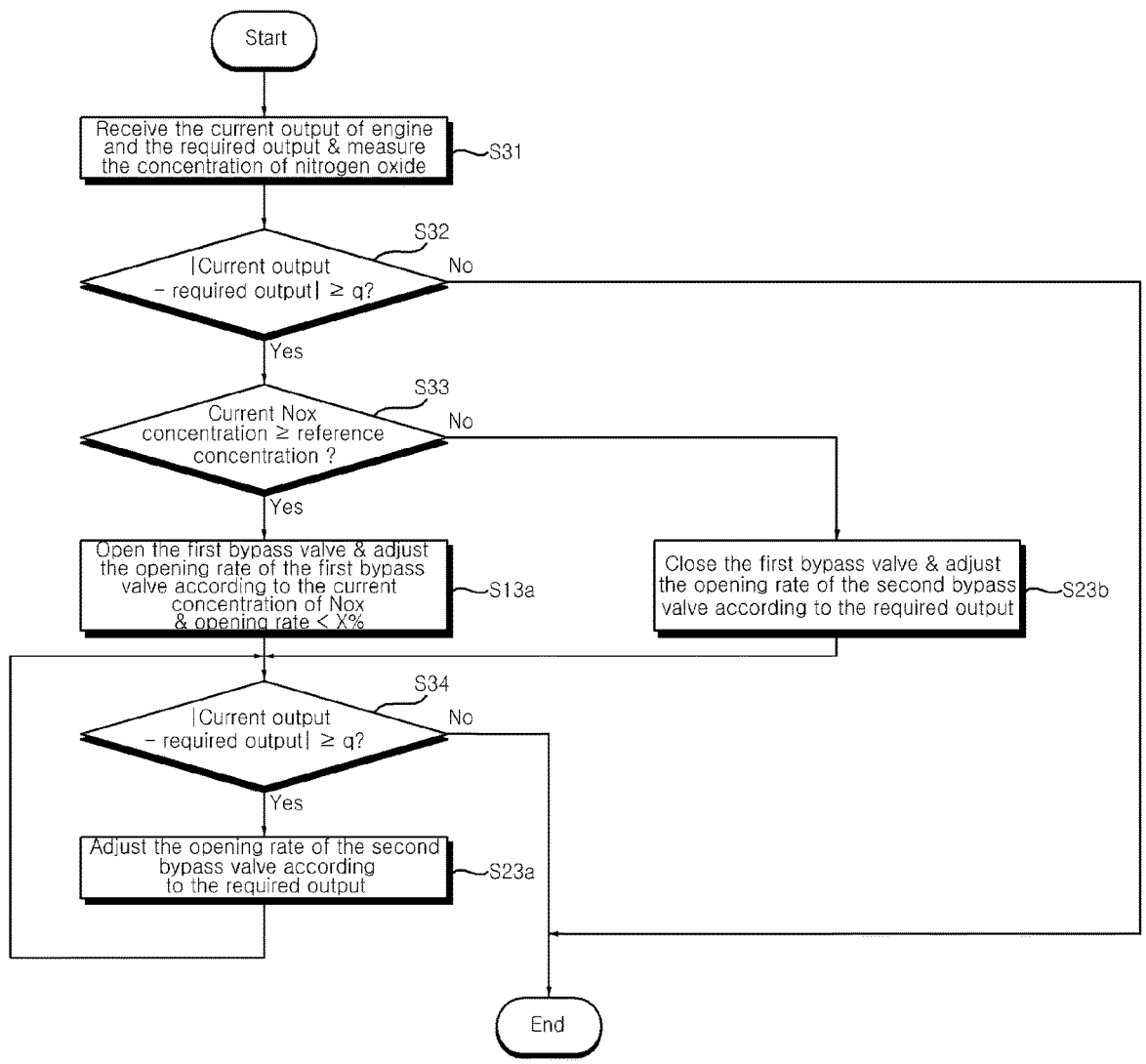
FIG. 9 is a flowchart of a control method of a gas engine heat pump according to another embodiment of the present disclosure.

Hereinafter, referring to FIG. 9, the controller 30 of the present disclosure may receive the current output and the required output from the engine 5, and may receive the concentration of nitrogen oxide from the sensor 9 (S31). Thereafter, the difference between the current output and the required output of the engine 5 is compared (S32), and when the difference between the current output and the required output is less than the error value q, the current opening degree of the first and second bypass valves 13 and 15 is maintained, and the process is terminated (No at S32). At this time, when the difference between the current output and the required output is equal to or greater than the error value q (Yes at S32), it is possible to compare the current concentration of nitrogen oxide contained in the exhaust gas and the reference concentration (S33).

Then, if the current concentration of nitrogen oxide is equal to or higher than the reference concentration (Yes at S33), the controller 30 opens the first bypass valve 13, while adjusting the opening rate of the first bypass valve 13 according to the concentration of the nitrogen oxide (S13a). Accordingly, there is an advantage in that the current output of the engine 5 and the required output can be matched while reducing the discharge amount of nitrogen oxides. The process of adjusting the opening rate of the first bypass valve 13 according to the concentration of nitrogen oxide may be the same as the above-described step S13 (refer to FIGS. 5 and 6).

At this time, for example, although the opening rate of the first bypass valve 13 according to the concentration of nitrogen oxide is 10%, if the opening rate of the first bypass valve 13 at which the difference between the current output of the engine 5 and the required output is less than the error value q is 5%, when the first bypass valve 13 is opened by 10%, the difference between the current output and the required output may be greater than or equal to the error value q.

Therefore, although the first bypass valve 13 is opened, the opening rate may be limited in consideration of the limit range of exhaust gas flowing into the engine 5 (refer to the description of FIG. 5) and the range in which the error value q is reduced (S13a). Accordingly, the opening rate of the first bypass valve 13 may be less than X'% (S13a).

Thereafter, the controller 30 compares again the current output of the engine 5 and the required output (S34), and when the difference is less than the error value q, the process is terminated (No at S34). In addition, when the difference is still greater than or equal to the error value q (Yes at S34), the controller 30 adjusts the opening rate of the second bypass valve 15 according to the required output so that the difference between the current output and the required output becomes less than the error value q (S23a).

Thereafter, the controller 30 continuously compares the current output and the required output of the engine 5 again, and when the difference between the current output and the required output is equal to or greater than the error value q, the above process is repeated, and when the difference is less than the error value q (No at S34), the opening rate of the second bypass valve 15 may be maintained and the process may be terminated.

Meanwhile, the difference between the current output of the engine 5 and the required output is compared (S32), and when the difference between the current output and the required output is equal to or greater than the error value q (Yes at S32), and when the concentration of the current nitrogen oxide contained in the exhaust gas is less than the reference concentration (No at S33), the controller 30 closes the first bypass valve 13 and adjusts the opening rate of the second bypass valve 15 according to the required output so that the difference between the current output and the required output becomes less than the error value q (S23b). The process of adjusting the opening rate of the second bypass valve 15 according to the required output may be the same as the above-described step S23 (refer to FIGS. 7 and 8). Thereafter, the process after step S34 is repeated. Since a description of this process has been described above, it will be omitted below.

FIGS. 10A, 10B, 10C and 10D illustrates an experimental result for the gas engine heat pump according to the embodiment of the present disclosure. In the gas engine heat pump of the present disclosure, the change in the operating point of the engine, and the change in the concentration of harmful gas contained in the exhaust gas by adjusting the opening rate of the first bypass valve 13 are measured.

Figure 10A:
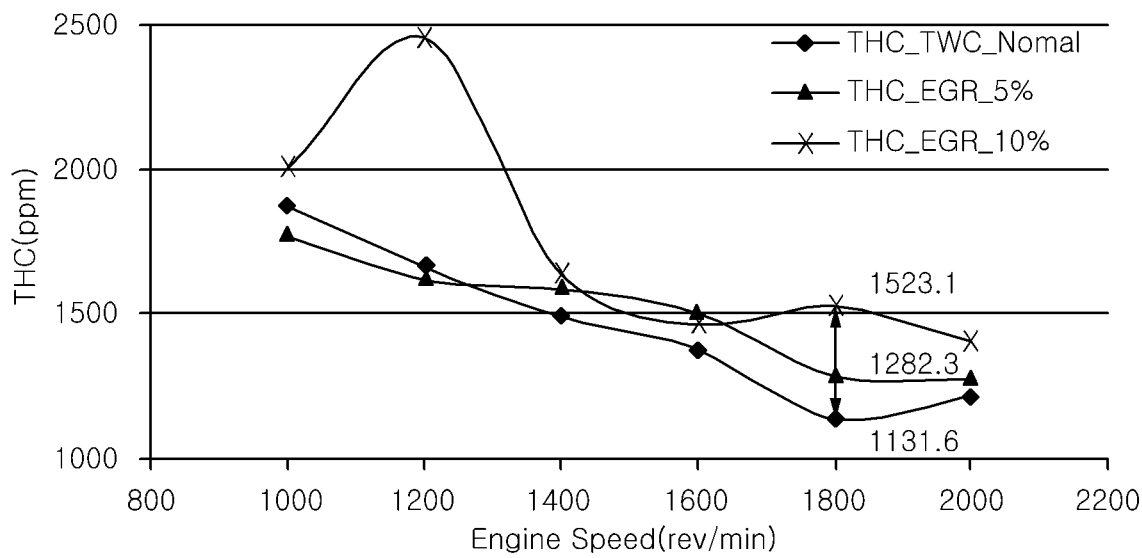
FIGS. 10A, 10B, 10C and 10D illustrate an experimental result of whether harmful substances in exhaust gas are reduced through the gas engine heat pump according to the present disclosure.
Figure 10B:
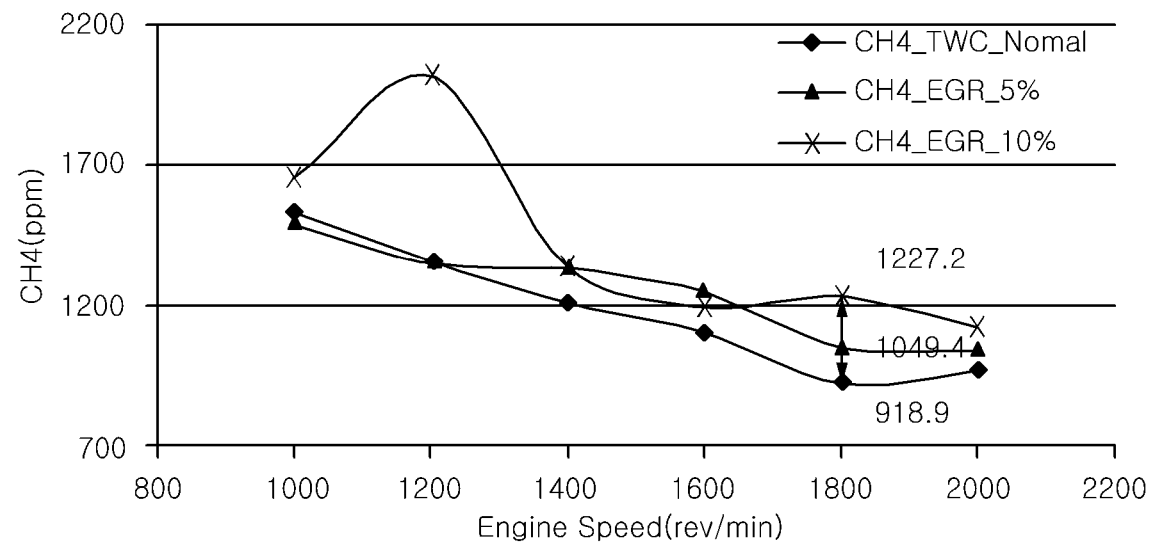
Figure 10C:
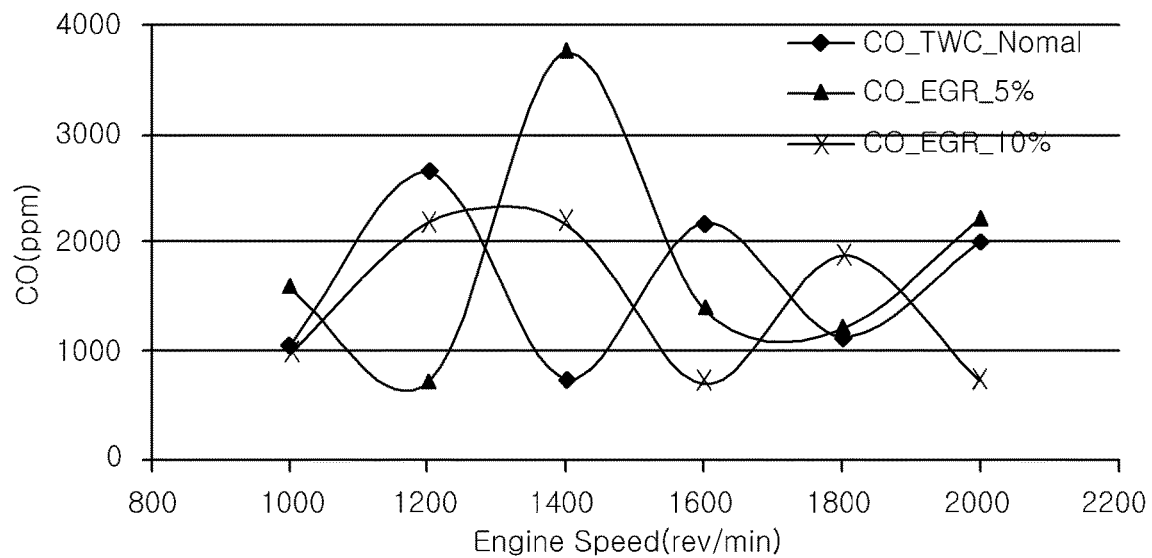

Hereinafter, referring to FIGS. 10A, 10B, and 10C, there is no significant difference in the amount of change in harmful gases HC, CH4, CO according to the operating point of the engine or the exhaust gas recirculation rate. However, in the case of carbon monoxide CO, the change according to the excess air rate is remarkable.

Figure 10D:
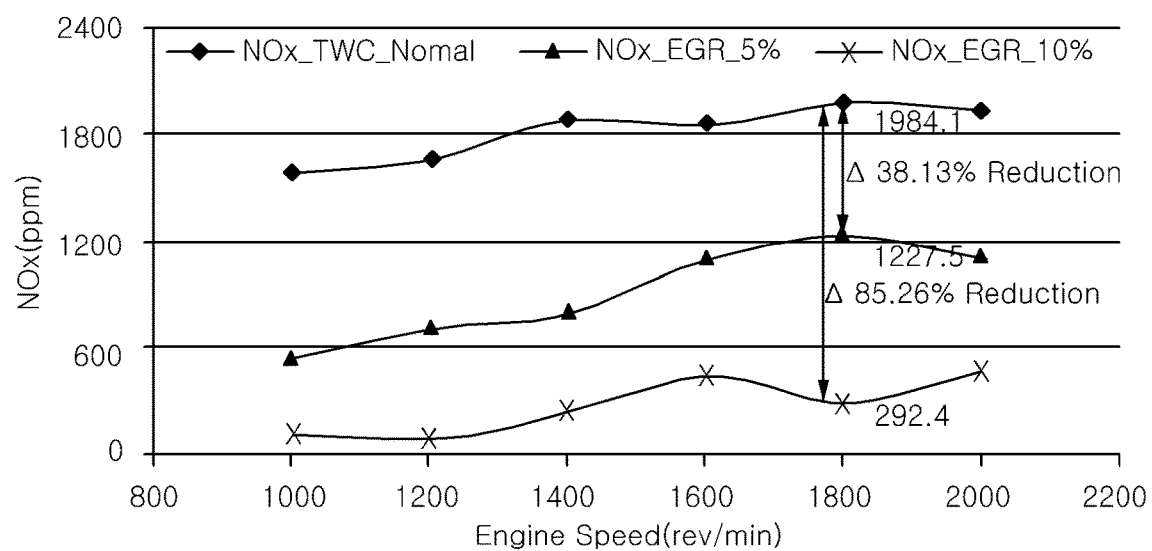

However, hereinafter, referring to FIG. 10D, there is a significant difference between the change in the operating point of the engine and the change in the concentration of nitrogen oxide (NOx) according to the exhaust gas recirculation rate. This is because as the specific heat of carbon dioxide, water vapor, or the like contained in the exhaust gas is large, heat is dissipated during combustion to lower the combustion temperature. In this experiment, in the case of nitrogen oxides, it is checked that the discharge amount of nitrogen oxide is reduced by a minimum of 38.13% and a maximum of 85.26% depending on the opening rate of the first bypass valve.

According to the gas engine heat pump of the present disclosure, there are one or more of the following effects.

First, there is an advantage in that it is possible to reduce the emission of harmful substances, such as nitrogen oxide, contained in exhaust gas while consuming little additional power.

Second, there is an advantage in that it is possible to reduce the emission of harmful substances by recirculating exhaust gas, while satisfying an output condition required for an engine.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and variations should not be understood individually from the technical idea or aspect of the present disclosure.

What is claimed is:

1. A gas engine heat pump, comprising:
    an engine that burns a mixture of air and fuel;
    an intake flow path through which the mixture is introduced into the engine;
    an exhaust flow path through which exhaust gas discharged from the engine flows, wherein the exhaust flow path is branched into a first exhaust flow path, a second exhaust flow path, and a third exhaust flow path, respectively, and then merged into a fourth exhaust flow path that discharges exhaust gas to outside, and wherein the exhaust flow path further includes a recirculation flow path branched from the fourth exhaust flow path to introduce exhaust gas into the engine;
    a first charger including a first compressor that is installed at the intake flow path and compresses the mixture of air and fuel and supplies the mixture of air and fuel to the engine, and a first turbine that is installed at the first exhaust flow path and receives exhaust gas directed from the first exhaust flow path to the fourth exhaust flow path to drive the first compressor;
    a second charger including a second compressor that compresses exhaust gas passing through the recirculation flow path and supplies exhaust gas to the engine, and a second turbine that is installed at the second exhaust flow path and receives exhaust gas directed from the second exhaust flow path to the fourth exhaust flow path to drive the second compressor;
    a first bypass valve installed at the second exhaust flow path, an opening rate of which is adjusted to control a flow amount of exhaust gas flowing from the second exhaust flow path to the fourth exhaust flow path;
    a second bypass valve installed at the third exhaust flow path, an opening rate of which is adjusted to control a flow amount of exhaust gas flowing from the third exhaust flow path to the fourth exhaust flow path; and
    a controller that adjusts the opening rate of the first bypass valve and the opening rate of the second bypass valve.

2. The gas engine heat pump of claim 1, further comprising a sensor that measures a concentration of nitrogen oxide contained in the exhaust gas discharged from the engine, wherein the controller adjusts the opening degree of the first bypass valve, based on the concentration of the nitrogen oxide measured by the sensor.

3. The gas engine heat pump of claim 2, wherein the controller opens the first bypass valve while increasing an opening rate of the first bypass valve as the concentration of the nitrogen oxide becomes higher within a limit range of exhaust gas supplied to the engine, when the concentration of the nitrogen oxide is greater than or equal to a reference concentration, and closes the first bypass valve, when the concentration of the nitrogen oxide is less than the reference concentration.

4. The gas engine heat pump of claim 3, wherein the limit range of exhaust gas supplied to the engine is defined as a range in which an amount of exhaust gas supplied to the engine is 15% or less of an amount of mixed air supplied to the engine.

5. The gas engine heat pump of claim 2, further comprising an exhaust gas heat exchanger that cools the exhaust gas discharged from the engine, wherein the sensor is disposed downstream of the exhaust gas heat exchanger.

6. The gas engine heat pump of claim 1, wherein the controller adjusts an opening rate of the second bypass valve so that a difference between a current output of the engine and a required output of the engine is less than an error value, when the current output of the engine differs from the required output of the engine by the error value or more.

7. The gas engine heat pump of claim 6, wherein the controller first adjusts the opening rate of the first bypass valve according to the concentration of nitrogen oxide, while adjusting the opening rate of the first bypass valve in a direction in which the error value is reduced, when the current output is different from the required output by the error value or more, and the concentration of nitrogen oxide is greater than or equal to the reference concentration, adjusts the opening rate of the second bypass valve so that a difference between the current output and the required output is less than the error value, when the current output is still different from the required output by the error value or more, and closes the first bypass valve and adjusts the opening rate of the second bypass valve so that the difference between the current output and the required output becomes less than an error value, when the current output is different from the required output by the error value or more, and the concentration of nitrogen oxide is less than the reference concentration.

8. The gas engine heat pump of claim 1, further comprising an exhaust gas heat exchanger that cools the exhaust gas discharged from the engine, wherein the second compressor compresses the exhaust gas that passed through the exhaust gas heat exchanger.

9. The gas engine heat pump of claim 1, further comprising a check valve through which the exhaust gas which is compressed by the second charger and supplied to the engine passes.

* * * * *